W. R. WALKER.
MECHANICAL DISH WASHER.
APPLICATION FILED JULY 28, 1916.
1,265,843.
Patented May 14, 1918.
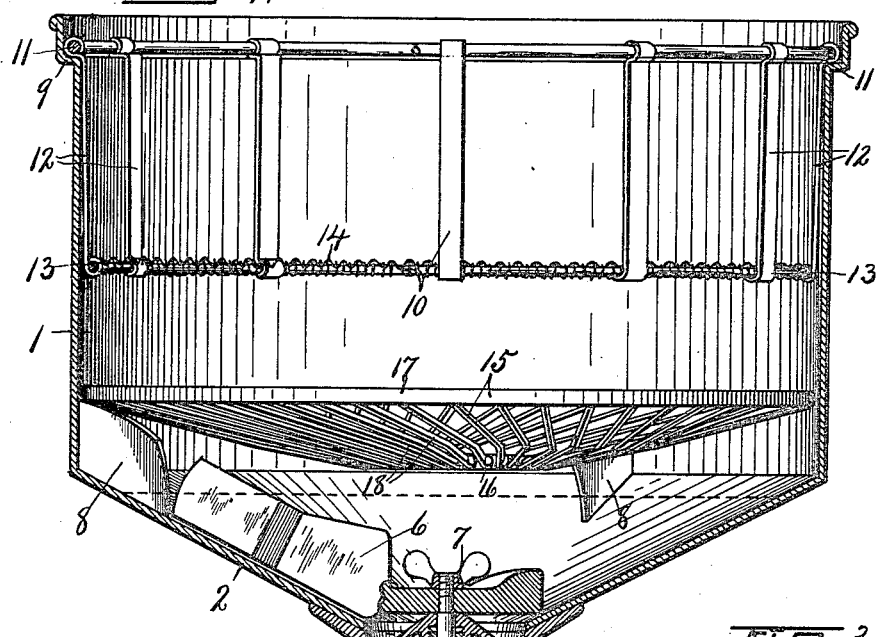
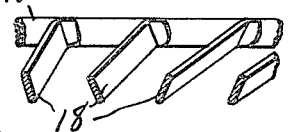
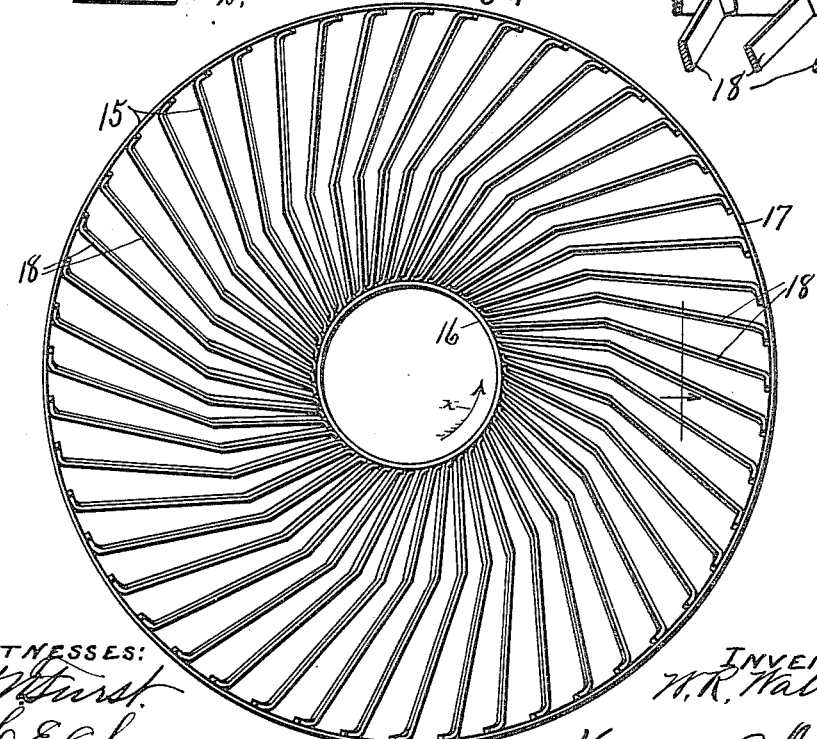
WITNESSES:
INVENTOR
W. R. Walker
ATTORNEY

UNITED STATES PATENT OFFICE.

WILLARD R. WALKER, OF SYRACUSE, NEW YORK, ASSIGNOR TO WALKER BROTHERS COMPANY, OF SYRACUSE, NEW YORK, A CORPORATION OF NEW YORK.

MECHANICAL DISH-WASHER.

1,265,843.

Specification of Letters Patent.

Patented May 14, 1918.

Application filed July 28, 1916. Serial No. 111,929.

*To all whom it may concern:*

Be it known that I, WILLARD R. WALKER, a citizen of the United States of America, and resident of Syracuse, in the county of Onondaga, in the State of New York, have invented new and useful Improvements in Mechanical Dish-Washers, of which the following, taken in connection with the accompanying drawings, is a full, clear, and exact description.

This invention relates to certain improvements in mechanical dish-washers of the class set forth in my pending applications, Serial Nos. 776,678, filed June 30, 1913, 811,720, filed January 12, 1914, 847,965, filed June 29, 1914, and 5,492, filed February 1, 1915, in so far as it is directed broadly to the use of an agitator or dasher or impeller movable centrally in the conical bottom of a vat containing the washing fluid, in combination with an openwork supporting tray for the dishes supported within the vat above the agitator, the present device being distinguished from those shown in applicant's pending applications by the use of a liquid-deflecting grid between the agitator and dish-supporting tray.

The object is to produce a more effective and systematic breaking up of the volume of liquid as it is impelled centrifugally and upwardly by the agitator through the dish-supporting tray.

In other words, I have sought to produce a more uniform distribution of the upwardly projected liquid throughout the area of the vat and dish-supporting tray by interposing between the agitator and said tray, a series of baffle plates or arms arranged in uniformly spaced relation circumferentially around the produced axis of the impeller and tangential to concentric circles of different diameters so as to counteract in a measure the centrifugal whirl of the liquid and cause it to be deflected upwardly by said baffle plates or arms through the dish-supporting tray.

Other objects and uses relating to specific parts of the device will be brought out in the following description.

In the drawings—

Figure 1 is a vertical sectional view of the upper portion of a dish-washing machine embodying the features of my invention.

Fig. 2 is a top plan of the detached baffle grid.

Fig. 3 is an enlarged detail sectional view of a portion of a grid showing the manner of securing the tangential arms to the outer ring.

In order that my invention may be clearly understood, I have shown a circular vat —1— as provided with a conical bottom —2— having an annular channel —3— in the apex thereof communicating with a discharge valve, not shown, but whereby the water may be drawn off the vat at any time.

The central portion or apex of the bottom —2— within the annular channel —3— is extended upwardly, and is preferably conical, and is provided with a gland —4— for receiving a rotary driving shaft —5— carrying at its upper end a revoluble impeller blade —6—, the latter being held in place upon the shaft by a winged nut —7—.

This blade travels around and in close proximity to the upper surface of the inclined bottom —2—, but is somewhat shorter than the radial width of said bottom to permit the use of a series of, in this instance three, fixed baffle plates or deflectors —8— which are secured to the bottom and sides of the vat, and together with the impeller —6— are similar to those shown in my pending application, Serial No. 811,720, and need not be further described herein for the reason that they are specifically claimed in the application referred to.

The upper end of the vat is enlarged to form a laterally projecting ledge or flange —9— for receiving and supporting an openwork dish-supporting tray —10—.

This tray comprises an upper main supporting ring —11— resting upon the flange —9— and provided with a series of pendent arms —12— spaced uniform distances apart and extending downwardly some distance into the vat where they are attached to another ring —13— for supporting a woven wire or equivalent bottom —14— upon which the dishes or other kitchen utensils to be washed are adapted to rest.

The bottom —14— of the dish-supporting tray is held some distance above the upper edges of the fixed baffle plates —8— and path of rotation of the impeller —6—, and upon the upper edges of the baffle plates is supported a circular baffle grid —15—.

This grid comprises an inner ring or band —16— of relatively small diameter and an outer circular band or ring —17— of approximately the same diameter as the interior diameter of the vat and rests loosely upon the upper edges of the fixed baffle plates —8— when the grid is adjusted for use, said inner and outer rings being connected by a system of angular spokes having their ends suitably secured, preferably by electric welding, to the rings.

These spokes are arranged in uniformly spaced relation relatively close to each other, but with sufficient clearance between them to allow the washing fluid to pass freely between them.

The angles of the spokes all face in the same direction circumferentially and are uniform distances from the center, the portions between the angles and inner ring being tangential to a circle concentric with, but of less diameter than said inner ring, while the portions between the angles and the outer ring are tangential to another circle concentric with, but of greater diameter than the inner ring, the object of which is to counteract in a measure the upward centrifugal whirling of the washing fluid as impelled by the rotation of the impeller —6— when moved in the direction indicated by arrow —X—, Fig. 2.

Both of the rings —16— and —17— are disposed in substantially parallel horizontal planes, one above the other, the central ring —16— being in the lower plane and, therefore, the spokes —18— incline downwardly and inwardly.

The spokes are preferably flat or rectangular in cross section and arranged edgewise at an angle to the vertical planes thereof, all of them being inclined upwardly from said planes in the direction of movement of the impeller so as to further facilitate the breaking up of the upwardly projected body of water and cause it to be distributed more uniformly throughout the area of the vat and dish-supporting tray.

By interposing this particular baffle grid between the path of rotation of the impeller and dish-supporting tray and constructing the impeller so as to throw the water upwardly and outwardly when rotated in the direction indicated by arrow —X—, it is evident that the upward centrifugal whirling motion of the washing fluid, as produced by the impeller, impinges against the longitudinally concaved faces of the spokes or deflecting blades —18—, which retard the centrifugal force and deflects the water upwardly through the dish-suporting tray with a force proportionate to the centrifugal force produced by the impeller, and by arranging these angular spokes or blades symmetrically and close together, it is evident that the upwardly projected body of water will be broken up into innumerable smaller bodies which pass through the dish-supporting tray and are brought into contact with all portions of the dishes therein to effect a thorough washing of the same, it being understood that the washing fluid may contain soap or other alkaline substances in the first washing, after which this may be drawn off and a new supply of clean water placed in the vat and agitated in the manner described to further cleanse the dishes which then remain in the tray to drip and dry, or may be taken out and wiped dry in the usual manner with suitable cloths.

What I claim is:

1. In a mechanical dish-washer, the combination of a vat containing a washing fluid, a rotary impeller movable across the bottom of the vat, a dish-supporting tray supported in the vat some distance above the path of movement of the impeller, and a baffle grid supported within the vat between the impeller and bottom of the dish-supporting tray and provided with spokes in spaced relation and having longitudinally concaved sides facing in a direction opposite to that of rotation of the impeller.

2. In a mechanical dish-washer, the combination of a vat, a rotary impeller movable across the bottom of the vat, a dish-supporting tray supported within the vat some distance above the path of movement of the impeller, a baffle grid supported within the vat between the impeller and tray and provided with spokes spaced uniform distances apart and convexed intermediate their ends with the convex surfaces facing in the direction of rotation of the impeller.

3. In a mechanical dish-washer, the combination of a vat, a rotary impeller movable across the bottom of the vat, a dish-supporting tray within the vat some distance above the impeller and a baffle grid within the vat, between the impeller and dish-supporting tray, and provided with a circular series of arms spaced uniform distances apart circumferentially and inclined downwardly from their outer ends toward the center.

4. In a mechanical dish-washer, the combination of a vat, a rotary impeller movable across the bottom of the vat, a dish-supporting tray within the vat some distance above the impeller and a baffle grid within the vat between the impeller and dish-suporting tray, and provided with a circular series of arms spaced uniform distances apart circumferentially and inclined downwardly from their outer ends toward the center, said arms having longitudinally concaved faces facing in a direction opposite that of the rotation of the impeller.

5. In a mechanical dish-washer, the combination of a vat containing a washing fluid, movable means within the vat for forcing the fluid upwardly, a dish-supporting tray within the vat some distance above said movable means, and a baffle grid within the vat between the movable means and tray and comprising inner and outer rings spaced some distance apart, and spokes connecting said rings and spaced uniform distances apart circumferentially, said spokes being concavo-convex longitudinally and arranged with their concave sides facing in a direction opposite that of the movement of the movable means.

In witness whereof I have hereunto set my hand this 18th day if July, 1916.

WILLARD R. WALKER.

Witnesses:
   H. E. CHASE,
   ALICE M. CANNON.